J. G. V. LANG.
ART OF REGULATING ELECTRIC MOTORS.
APPLICATION FILED JUNE 1, 1909.
1,025,877.
Patented May 7, 1912.
5 SHEETS—SHEET 1.
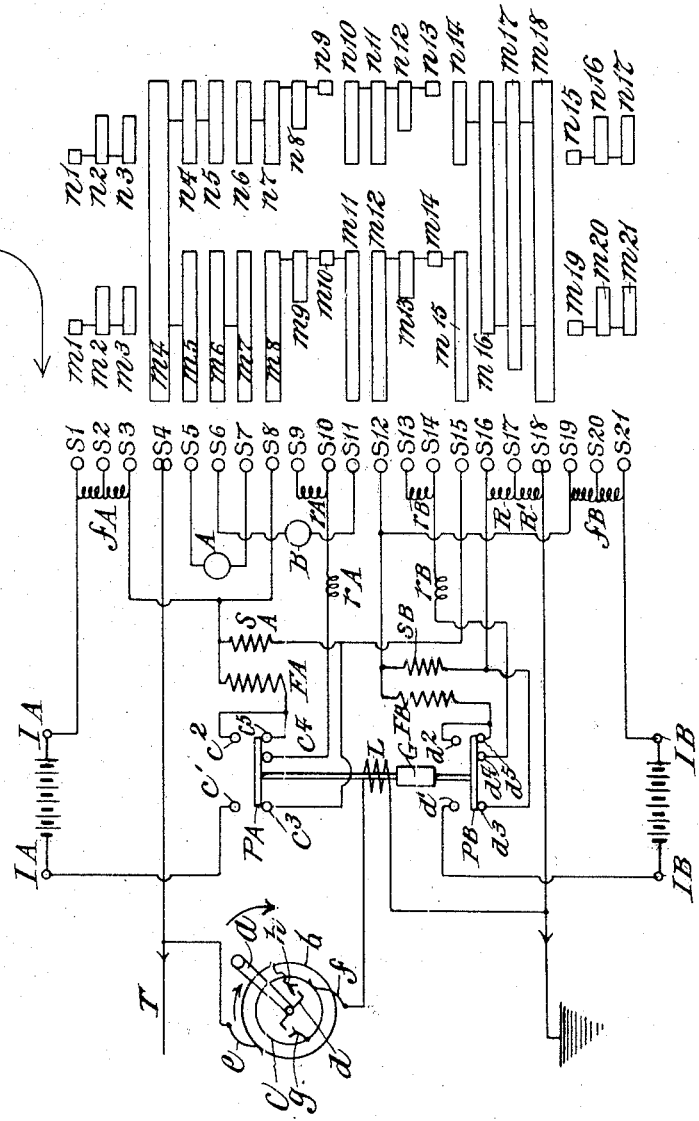

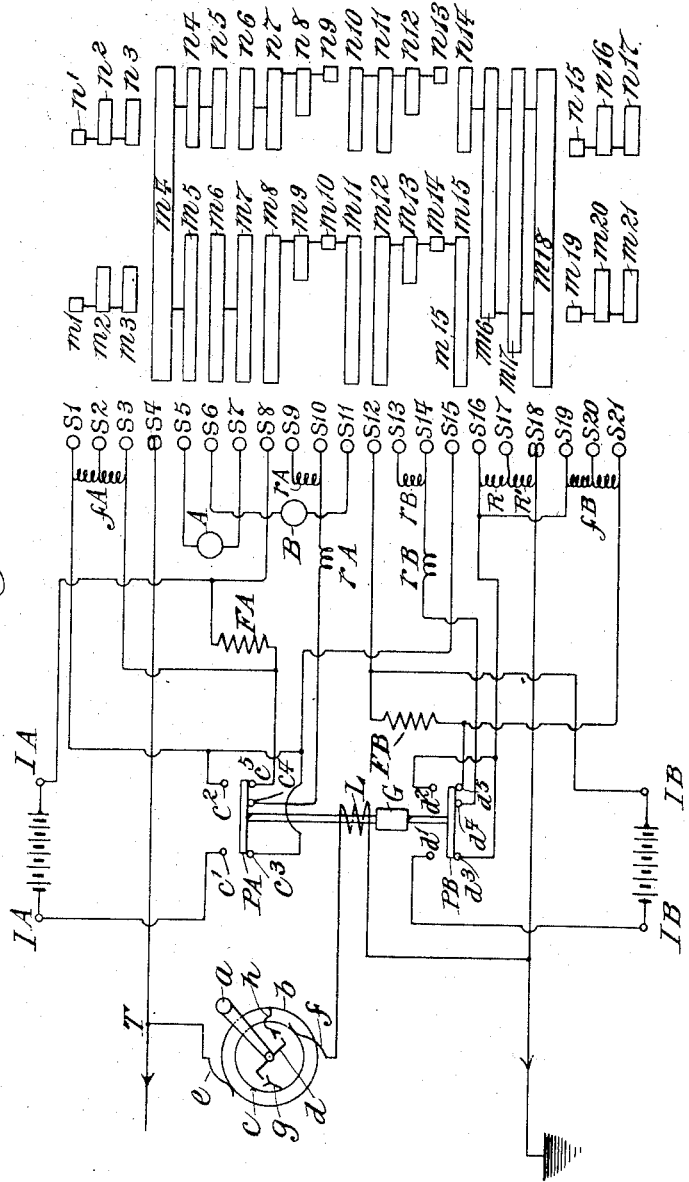

J. G. V. LANG.
ART OF REGULATING ELECTRIC MOTORS.
APPLICATION FILED JUNE 1, 1909.
1,025,877.
Patented May 7, 1912.
5 SHEETS—SHEET 3.
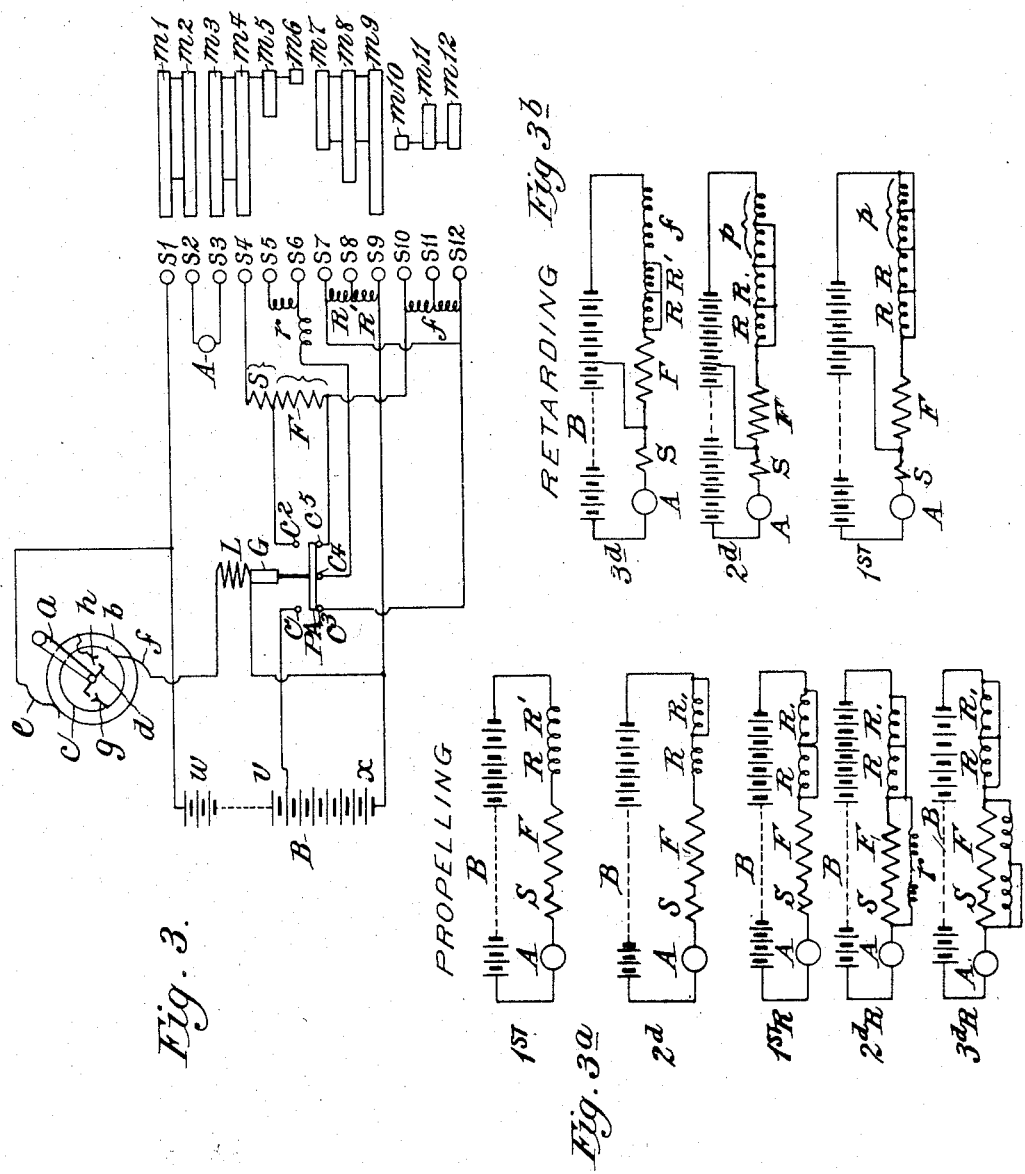

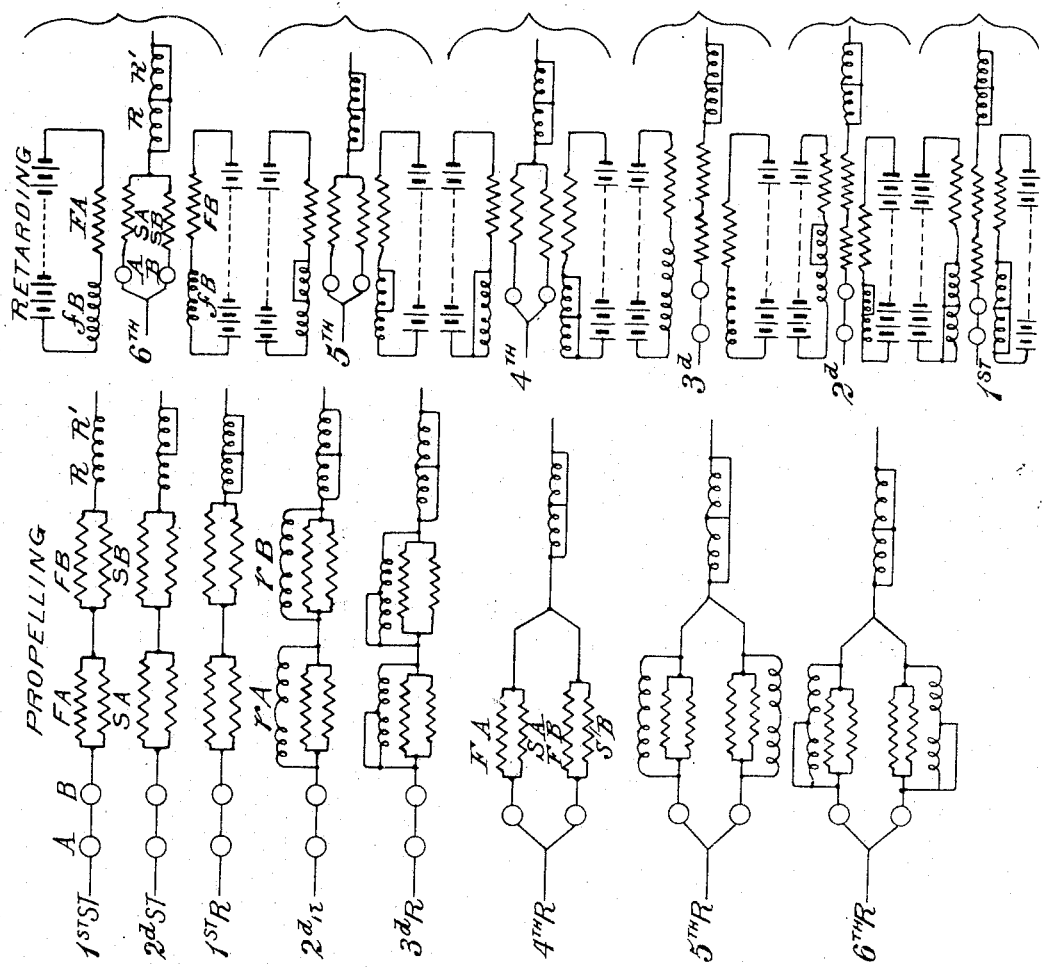

J. G. V. LANG.
ART OF REGULATING ELECTRIC MOTORS.
APPLICATION FILED JUNE 1, 1909.
1,025,877.
Patented May 7, 1912.
5 SHEETS—SHEET 5.
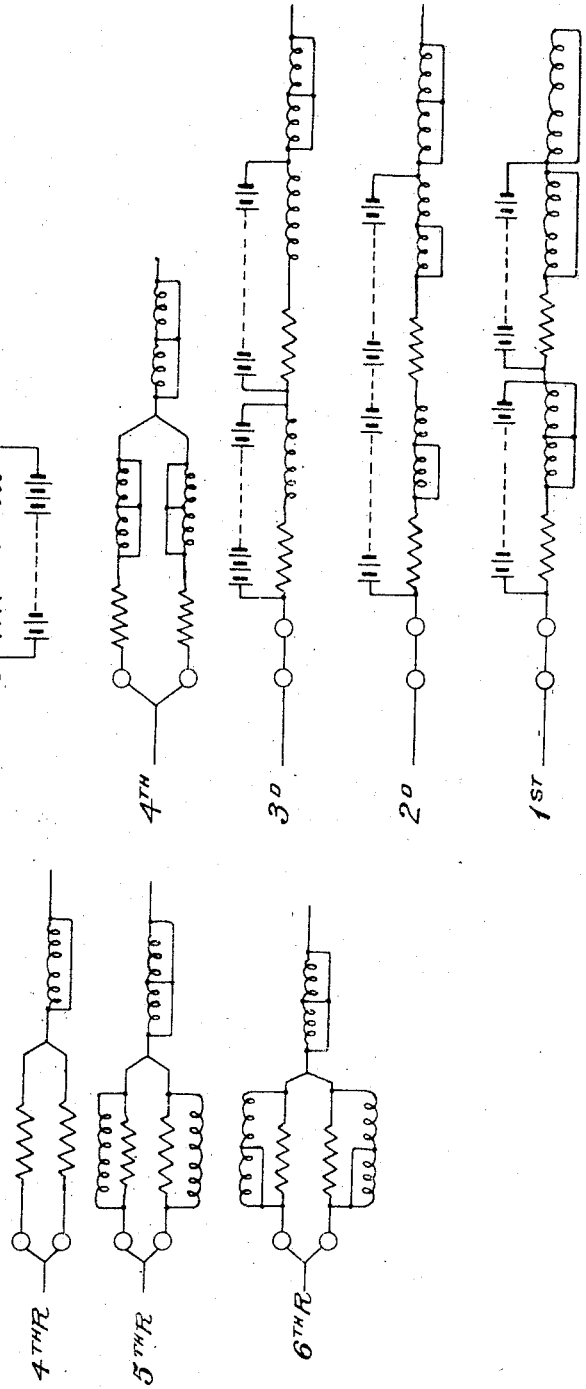
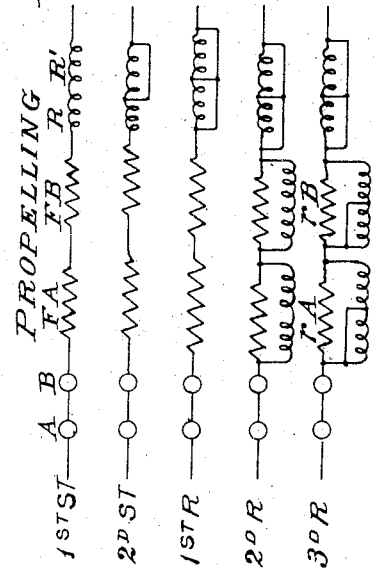

UNITED STATES PATENT OFFICE.

JOHAN G. V. LANG, OF DAVENPORT, IOWA, ASSIGNOR OF ONE-HALF TO EDWARD H. JOHNSON, OF NEW YORK, N. Y.

ART OF REGULATING ELECTRIC MOTORS.

1,025,877.  Specification of Letters Patent.  Patented May 7, 1912.

Application filed June 1, 1909. Serial No. 499,547.

*To all whom it may concern:*

Be it known that I, JOHAN G. V. LANG, a subject of the King of Sweden, and resident, temporarily, of Davenport, county of Scott, and State of Iowa, have made a new and useful Invention in the Art of Regulating Electric Motors, of which the following is a specification.

My invention is directed to improvements in the regulation of electric motor systems of the regenerative type, such, for instance, as are disclosed in prior U. S. patents granted to me on the 9th day of August, 1904, and numbered respectively Nos. 767,154 and 767,350, and it has for its object, the establishment of a series field excitation for propulsion and the equivalent of a shunt or compound excitation for retardation through the agency of independent sources of electrical supply. The method of control or regulation disclosed in the beforementioned patents, consisted in causing the motors to run as ordinary series motors during the time that they are acting to propel a vehicle, and as shunt or compound motors while acting regeneratively for braking purposes. It is found in practice that an ordinary shunt field, when connected across the mains and, therefore, subjected to the line voltage, necessitates a relatively fine subdivision of the copper conductors, and is thus associated with a low space factor. Furthermore, a shunt field for high voltage is highly inductive and thus gives rise to difficulties in connection with insulation and manipulation of the system. It is also found that when the space for the motors is limited in such manner that the field winding has to be used alternately as series and shunt windings, the leads from the motors become numerous and the field changing switch is necessarily comparatively complicated.

It is one of the objects of the present invention to overcome these various difficulties by providing one or more separate sources of supply, as a battery or batteries; or, power driven generator or generators, the latter driven directly from the axle or axles of the vehicle; or, a transformer for the purpose of supplying the energizing current for that part of the field which is to be made independent of the load, in order to give to the motors the desired regenerative characteristic. By such means I am practically unlimited in my choice of voltage and am able to adapt it to the winding or windings which will best suit the series field combination and will, at the same time, reduce the complication of the motor winding and of the field changing switch to a minimum.

In changing from the series field to the separately excited field, or vice versa, it is advantageous to keep the main circuit of the motors closed through a suitable number of series coils, as disclosed in prior U. S. patents granted to me on the 9th day of August, 1904 and numbered respectively 767,155 and 767,351, for the purpose of avoiding a rush of current due to sluggishness of the field in building up after its momentary reduction. Inasmuch, however, as the separately excited field windings possess relatively small self-induction they may not necessitate to the same extent, the precaution to be taken against an undue rush of current as described in said patents.

The present invention is applicable also to cases where the equivalent of compound motors is obtained by keeping a suitable series field energized, not only by current through the main motors, but also by current from an independent source of supply, which latter determines the maximum value of the independent excitation. In applying the present invention to such a system the separate or independent current supply above referred to is disconnected from the series field windings, or a part thereof while propulsion is taking place, and is rendered active only during retardation. This change of connection may be performed by means of a change switch or switches, the result being, as in the present arrangement, that the motors have a series characteristic during propulsion and a compound characteristic during retardation.

For a full and clear understanding of my invention, such as will enable others skilled in the art to construct and use the same, reference is had to the accompanying drawings, in which, Figure 1 illustrates in diagrammatic view a controller for two motors with the field of each motor split up in two parts, one of which is constantly used as a series field, and the other as a series field during propulsion but as a separately excited field during retardation, the movable controller contacts being shown upon the right of the drawing and the independent sources of electrical energy illustrated as batteries. Fig. 2 is a diagrammatic view similar to Fig. 1 illustrating the manner in which the independent field is obtained by applying electromotive force to both terminals of a field constantly connected in series with the corresponding armature, it being understood that the idea of obtaining the equivalent of a compound excitation in this way is well known in the art. Fig. 3 illustrates a simple arrangement for the application of my improvement in connection with a single motor and a battery supplying the total energy, the same being particularly adapted for use in connection with motor propelled vehicles. Fig. 3$^a$ represents diagrammatically the propelling changes under the various conditions of the controller; and Fig. 3$^b$ the retarding changes under like conditions. Fig. 4 represents diagrammatically the various propelling and retarding changes under various positions of the controller, as applied to that form of the invention illustrated in Fig. 1; and Fig. 5 represents the like conditions as applied to that form of the invention illustrated in Fig. 2.

Referring now to the drawings in detail in all of which like letters and numerals of reference represent like parts wherever used, A and B are the armatures and SA and SB the field coils of two independent motors, which field coils are designed to be used in series with said armatures respectively during propulsion and retardation.

FA and FB represent respectively independent sections of the field windings which are designed to be energized by the main current, or part of the main current during propulsion and by current from separate or independent sources of supply during retardation.

$rA$ and $rB$ represent resistances used in parallel with the series field winding during propulsion, for the purpose of varying the field strengths.

R and R$^1$ are starting resistances and $fA$, $fB$ resistances for varying the strength of the independent excitation.

$s^1$ to $s^{21}$ represent the fixed contacts of the controller permanently operatively connected with the various circuits of the two motors as shown.

$m^1$ to $m^{21}$ and $n^1$ to $n^{17}$ represent the movable contacts of the controller adapted when rotated to contact in the usual way with the fixed contacts $s^1$ to $s^{21}$.

Referring to the field changing switch $c^1$ to $c^5$ represent the stationary contacts of the field changer which control the field circuits of that motor in which the armature is indicated by the letter A.

$d^1$ to $d^5$ are the corresponding stationary contacts of the field changer which control the field circuits of that motor as indicated by the letter B.

PA and PB are the movable contacts of the field changing switch, said contacts being supported at the opposite ends of a rod carrying a solenoid core G adapted to be moved in one direction by the field changing solenoid L and in a reverse direction by gravity.

It is obvious that the arrangement the contacts of the field changing switch may be disposed and operated in a various number of ways, such as will readily suggest itself to those skilled in the art. It is also to be noted that the field coils SA and FA, SB and FB are connected in parallel during propulsion, but obviously these coils might be arranged so as to have them connected in series by simply varying the contacts of the switch and their connections in a manner known to those skilled in the art. In case a simple shunt excitation is desired during retardation the field windings SA and SB would not be necessary.

The field changing switch may be controlled by the solenoid L in any preferred way. I have illustrated in the drawings circuit connections operatively connected with the drum of the controller in which the operating handle thereof indicated by the letter $a$ is yieldingly connected with the drum and carries a contact arm $d$, the opposite ends of which are normally out of contact with stationary contacts $g$, $h$ connected respectively with contact rings $c$, $b$, supported by the drum, $e$, $f$ being contact brushes resting on the rings $b$, $c$, which brushes are connected to the trolley conductor T or other source of electrical energy, and $f$ through the solenoid L to earth, the circuit being normally open during propulsion, as shown.

IA and IB represent independent sources of electrical energy, IA being indicated as permanently connected on one side through the resistances $fA$ to the field coils SA, FA, and IB similarly connected through resistances $fB$ and field coils SB, FB. These two independent sources of electrical energy are normally on open circuit at the points $c^1$ $d^1$ respectively.

Presuming now that the controller has been turned to the first running position (see Fig. 1) under the influence of the controlling handle $a$ by rotating the same from right to left in the direction of the arrow until the movable contacts $m^1$ $m^2$ $m^3$ of the controller are resting upon the fixed contacts $s^1$ $s^2$ $s^3$, the working current flow will be as follows—from the trolley conductor T, fixed contact $s^4$, movable contacts $m^4$ $m^5$, fixed contact $s^5$, armature A fixed contact $s^7$, movable contacts $m^7$ $m^8$, fixed contact $s^8$, armature B, fixed contact $s^{11}$, movable contacts $m^{11}$ $m^{10}$, $m^9$, $m^8$, fixed contacts $s^4$ to the field magnet coils SA and FA. That part of the current flowing through FA passes onward through the stationary contact $c^5$, movable contact PA and stationary contact $c^3$ of the field changing switch, where it joins the other portion of the current flowing through the coil SA and passes thence to the fixed contact $s^{15}$, through movable contacts $m^{15}$ $m^{14}$ $m^{13}$ $m^{12}$ to fixed contact $s^{12}$ in multiple through the field magnet coils SB and FB of the two motors, the current passing through FB continuing through the lower stationary contact $d^5$ movable contact PB and the stationary contact $d^3$ of the field changing switch where it joins the current flowing through the field magnet SB, passing thence to the fixed contact $s^{16}$, through the movable contacts $m^{16}$ $m^{17}$ $m^{18}$ by the fixed contact $s^{18}$ to earth. The starting resistances R and R¹ are short-circuited by the movable contacts $m^{16}$ to $m^{18}$ through the fixed contacts $s^{16}$ to $s^{18}$, as the controller is advanced. Suppose now that it be desired to give to the system a regenerative and retarding effect, due to the influence of the independent sources of electrical energy IA and IB and without interrupting the working circuit. On reversing the direction of rotation of the handle $a$ which is yieldingly connected to the controller drum in such manner as not to rotate the latter until moved through a certain angle relative to it; i. e., not until the circuit is closed between the contact $d$ and the contacts $g$ and $h$ so that a branch of the power circuit is diverted from the trolley conductor T through the brush $e$, contact ring $b$, contacts $h$, $d$ and $g$, contact ring $c$, brush $f$, solenoid L to earth, which energizes the solenoid L and causes the same to elevate the solenoid core G, thus shifting the field changing switch to its upper position, so that a circuit is now closed from the upper or independent source of electrical energy IA by way of fixed contact $s^1$, movable contacts $m^1$ $m^2$ $m^3$, fixed contact $s^3$, through field coil FA, stationary contact $c^2$, movable contact PA and stationary contact $c^1$ to the other pole of the independent source of electrical energy IA. In the same manner a like circuit is closed from the independent source of electrical energy IB, through the fixed contacts $s^{21}$ to $s^{19}$, movable contacts $m^{21}$ $m^{20}$ $m^{19}$ through the field coil FB and upper stationary contact $d^2$, movable contact PB and stationary contact $d^1$, to the other pole of the independent source. The two coils FA and FB are, therefore, thus independently excited which, assuming the speed not to be below the minimum braking speed of the controller position, will cause current to flow from the armatures A and B to fixed contacts $s^5$, $s^6$.

Assuming the controller position to be on the first runing notch as before, the current from contact $s^6$ will flow through movable contacts $m^6$ $m^7$, fixed contact $s^7$ through the armature A, fixed contact $s^5$ and from there through movable contacts $m^5$ $m^4$ through the trolley conductor T back to ground, fixed contact $s^{18}$ movable contacts $m^{18}$ $m^{17}$ $m^{16}$, fixed contact $s^{16}$, field coil SB, fixed contact $s^{12}$, movable contacts $m^{12}$ $m^{13}$ $m^{14}$ $m^{15}$, fixed contact $s^{15}$, field coil SA, fixed contact $s^8$, movable contacts $m^8$ $m^9$ $m^{10}$ $m^{11}$, fixed contact $s^{11}$ to armature B. During propulsion the resistances $r$A and $r$B are brought into action at certain notches of the controller through the medium of fixed contacts $s^9$ $s^{10}$ and movable contacts $m^9$ $m^{10}$, fixed contacts $s^{13}$ $s^{14}$ and movable contacts $m^{13}$ $m^{14}$ respectively. Current is diverted from the contact $m^8$, that is from the positive ends of the field coils FA and SA on the one end and from the movable contact $m^{12}$ from the positive end of the field coils SB and FB and joins the main current after passing over contacts $c^4$ $d^4$, movable contacts PA PB and stationary contacts $c^3$ $d^3$ respectively. During retardation the resistances $f$A and $f$B are either short circuited or operative as the speed requirements may necessitate by means of the fixed contacts $s^1$ to $s^3$, movable contacts $m^1$ to $m^3$, fixed contacts $s^{19}$ to $s^{21}$ movable contacts $m^{19}$ to $m^{21}$ respectively.

That modified form of the invention illustrated in Fig. 2 of the drawings differs from the form illustrated in Fig. 1 only in that the independent field is obtained by applying to the series field terminals a suitable electromotive force sufficient to cause a certain amount of current to flow from the positive terminals, independent of the main current, except to an extent equal to the desired compensating action, i. e., corresponding to the action of the series turns, as illustrated in the modified form disclosed in Fig. 1; that is to say, that form of the invention shown in Fig. 2 illustrates the invention as embodying a method of operation which is the equivalent of a compound excitation. In this form of the invention A and B are armatures as before FA and FB the field windings. $r$A and $r$B retarding resistances for field variation during propulsion; $f$A and $f$B resistances for varying the strength of the independent excitation, stationary contacts $c^5$ $c^3$ $d^5$ $d^3$ being used for the purpose of short-circuiting the resistances $f$A and $f$B during propulsion, the circuit relations between the other parts of the field changing switch, the controller and operative connections being the same as illustrated in Fig. 1. In this form of the invention supposing the controller to be set upon the first notch, the current flow is as follows, from the trolley conductor T through fixed contact $s^4$, movable contacts $m^4$ $m^5$, fixed contact $s^5$, armature A, contact $s^7$, movable contacts $m^7$ $m^6$, fixed contact $s^6$, armature B, fixed contact $s^{11}$, movable contacts $m^{11}$ $m^{10}$ $m^9$ $m^8$, fixed contact $s^8$ to field coil FA. In case the fixed contacts $s^9$ or $s^{10}$ engage with the movable contacts $m^9$ or $m^{10}$, a part of the current will flow through the diverting resistance $rA$ and join the field current by passing over contact $c^4$ to movable contact PA. The main current then passes over fixed contact $c^3$ of the field changing switch, stationary contact $c^5$ to fixed contact $s^{15}$, movable contact $m^{15}$ $m^{14}$ $m^{13}$ $m^{12}$ to fixed contact $s^{12}$, field magnet FB and contact $d^5$. The current may or may not be diverted at movable contacts $m^{13}$ $m^{14}$ and pass through fixed contacts $s^{13}$ $s^{14}$ in case these contacts thus engage, passing thence through resistance $rB$ to stationary contact $d^4$, joining the current through the field at FB, movable contact PB, proceeding over stationary contact $d^3$, fixed contact $s^{16}$, movable contacts $m^{16}$ $m^{17}$ $m^{18}$ to fixed contact $s^{18}$ to ground. When the field changing switch is moved so that the movable contacts PA and PB contact respectively with stationary contacts $c^1$ $c^2$ $d^1$ $d^2$ the separate sources of electrical energy are connected to the field terminals and current will flow from the independent sources of electrical energy IA and IB to the field windings FA and FB, passing in certain positions through the resistance $fA$ and $fB$ over stationary contacts $c^1$ PA $c^2$ and $d^1$, movable contact PB, stationary contact $d^2$ back to the negative terminals of said independent sources of energy. The current flow in the main circuit under these conditions will be from the armature B through the armature A to trolley conductor T and to ground by way of fixed contact $s^{18}$, movable contacts $m^{18}$, $m^{16}$, fixed contact $s^{16}$ over stationary contact $d^2$, movable contact PB, stationary contact $d^1$ through the separate source of electrical energy IB, the field current from the field magnet FB passing the same way having joined it before reaching the stationary contact $d^2$, then passing to contact $s^{12}$, movable contacts $m^{12}$ $m^{13}$ $m^{14}$ $m^{15}$, fixed contact $s^{15}$ by way of stationary contact $c^2$, movable contact PA, stationary contact $c^1$ through the independent source of electrical energy IA, to fixed contact $s^8$, movable contacts $m^8$ $m^9$ $m^{10}$ $m^{11}$, fixed contact $s^{11}$ back to the armature B.

In the notched diagrams illustrated in Figs. 4 and 5 as applicable to modified forms of invention shown in diagrammatic views Figs. 1 and 2, the sources of current supply are indicated by batteries.

In the modified form of the invention illustrated in Fig. 3, particularly adapted for use in connection with motor vehicles operated and controlled by storage batteries, the arrangement of the circuits of the controller switch is as illustrated in the preceding diagrams, and in this instance only a single motor is shown in which A denotes the armature S a part of the field magnet coil, used as series coils during propulsion and retardation (this may under certain circumstances be omitted) and F the main part of such field coil. $r$ indicates a diverting resistance for field variation during propulsion. R $R^1$ starting resistances $f$ resistance for variation of the independent field excitation during retardation. B represents the source of current supply illustrated as a battery and $v$ and $w$ a sectional part of the battery B. L is the solenoid of the field changing switch and G the core therefor, P the movable contact and $c^1$ $c^2$ $c^3$ $c^4$ $c^5$ the stationary contacts. $s^1$ to $s^{12}$ and $m^1$ to $m^{12}$ represent as before the contacts of the controller operatively connected with a drum in the usual manner and manipulated by the handle $a$, as before, the circuit relations between the solenoid L, the contact rings $b$, $c$, movable contact $d$ and fixed contacts $g$ and $h$ and brushes $e$ and $f$ being connected to the solenoid L and with the battery circuit B as shown. With this form of the invention with the controller in the first notch the current passes from the entire battery B by way of the fixed contact $s^1$, movable contacts $m^1$ $m^2$, fixed contact $s^2$, armature A, fixed contact $s^3$, movable contacts $m^3$ $m^4$, fixed contact $s^4$ through the entire field coil SF to stationary contact $c^5$ movable contact P, stationary contact $c^3$ to fixed contact $s^7$, movable contact $m^7$ $m^8$ $m^9$ to fixed contact $s^9$ back to battery. When the resistances $r$ are in circuit, part of the current passes over movable contacts $m^5$ $m^6$ and fixed contacts $s^5$ or $s^6$ and joins the main current at movable contact P through stationary contact $c^4$. During retardation the solenoid L is energized by rotating the controller handle $a$ as before so as to connect up the movable contact $d$ and fixed contacts $g$, $h$. Thus the solenoid core G is energized and current is flowing from $v$ over $c^1$, movable contact P, stationary contact $c^2$, field F, resistance $f$ provided the latter is not short-circuited by engagement between the fixed contacts $s^{10}$ to $s^{12}$ and the movable contacts $m^{10}$ to $m^{12}$ fixed contact $s^9$ back to battery. The main current will pass from armature A, fixed contact $s^2$ movable contacts $m^2$ $m^1$, fixed contact $s^1$ to that part of the battery indicated by the letters $w$ $v$, charging the same, proceeding by way of stationary contact $c^1$ movable contact P, contact $c^2$ back to that part of the field indicated by S, fixed contact $s^4$, movable contacts $m^4$ $m^3$, fixed contact $s^3$ to the armature.

In Fig. $3^a$ are illustrated the various propelling conditions resulting from the movement of the controller, the circuit relations all being clearly outlined in this view of the drawings, while in Fig. $3^b$ are illustrated in like manner the various retarding conditions which result from reversing the controller handle *a* at the various notches of the controller, the circuit relations all being clearly indicated.

I do not limit my invention to any especial arrangement of circuits and circuit relations with control devices such as are shown in the accompanying drawings, as I wish it understood that my improvement is generic in relation to the features disclosed and that the same is applicable generally in the arts where it is desired to utilize motors for propulsive or regenerating and braking effects; such, for instance, as in motor vehicles or motor boats propelled by current from storage batteries; electric tram cars and like vehicles propelled by currents from power circuits, as trolley conductors or third rails; electrically driven elevators or lifts, and the like, and my claims are designed to be of such scope as to include all such uses.

Having thus described my invention what I claim and desire to secure by Letters Patent of the United States is—

1. In a system of electrical energy, a power circuit, a controller, a plurality of motors each having an armature and field windings, sources of current supply extraneous to the power circuit as regards relationship to the motor system; together with circuits and circuit connections whereby the motors run as series motors during propulsion but are given a variable degree of shunt characteristic by excitation from the extraneous supply sources and thus act as generators and with breaking effect when retardation is required, substantially as described.

2. In a system of electrical energy, a power circuit, a plurality of series wound electric motors; in combination with electrical generators extraneous to the power circuit as regards relationship to the motors; together with means whereby said generators are connected to field windings of the motors when retardation is required, thus giving the motors a variable degree of shunt characteristic causing them to act as generators with braking effect, but are disconnected from the field windings during propulsion causing the motors to run as series motors, substantially as described.

3. In a system of electrical energy, a power circuit, a plurality of series motors each having an armature and series field windings, sources of current supply extraneous to the power circuit as regards relationship to the motors, said sources being disconnected from said series field windings during propulsion; together with means for connecting the said sources of extraneous current supply across the series field windings of said motors, substantially as described.

4. In a system of electrical energy, a power circuit, a plurality of series wound electric motors having each an independent field coil normally disconnected from an electrical generator independent of the power circuit; a field changing switch electro-magnetically controlled, and a controller adapted to effect the current changes to the motors; together with means operatively connected with the controller for connecting a source of electrical energy to and disconnecting it from the control magnet of the field changing switch, whereby the motors are adapted to act as series wound motors during propulsion and as regenerators with braking effect on reversal of the controller handle, substantially as described.

5. In a system of electrical energy, a power circuit, a plurality of series wound electric motors having each an independent field coil, sources of current supply independent of the power circuit, a field changing switch and connections between the same and the independent sources of current supply; together with a circuit control switch for actuating the field changing switch, the entire arrangement being such that during propulsion the independent field coils are disconnected from the independent sources of current supply, the motors acting in series relation, and when the control switch is reversed they are connected in circuit with the independent sources of current supply and acting as regenerators and with braking effect, substantially as described.

6. In a system of electrical energy, a power circuit, a plurality of series wound electric motors having each an independent field coil, a source of electrical energy for each motor independent of the power circuit, a controller and operative connections therefrom to the motors, a field changing switch, and a switch control magnet or solenoid therefor operatively connected with a second switch connected in turn to or carried by the controller drum; the relations between all of said parts being such that the motors act during propulsion as series wound motors and as regenerators with braking effect when the second switch is reversed and while the power current is still connected to the motors, substantially as described.

In testimony whereof I have signed my name to this specification in the presence of two subscribing witnesses.

JOHAN G. V. LANG.

Witnesses:
JOHN BERWALD,
WM. CARSTEN.

Copies of this patent may be obtained for five cents each, by addressing the "Commissioner of Patents, Washington, D. C."